(12) United States Patent
Olgaard

(10) Patent No.: US 10,666,538 B2
(45) Date of Patent: May 26, 2020

(54) METHOD FOR TESTING A RADIO FREQUENCY (RF) DATA PACKET SIGNAL TRANSCEIVER VIA A WIRELESS SIGNAL PATH

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, San Jose, CA (US)

( * ) Notice: Subject to any disclaimer, the term of this patent is extended or adjusted under 35 U.S.C. 154(b) by 0 days.

(21) Appl. No.: 14/721,598

(22) Filed: May 26, 2015

(65) Prior Publication Data

US 2016/0352611 A1    Dec. 1, 2016

(51) Int. Cl.
  *H04L 12/26*   (2006.01)
  *H04L 1/20*    (2006.01)
  *H04W 24/00*   (2009.01)

(52) U.S. Cl.
  CPC .............. *H04L 43/50* (2013.01); *H04L 1/203* (2013.01); *H04W 24/00* (2013.01)

(58) Field of Classification Search
  CPC ..... H04L 43/50; H04L 43/00; H04L 43/0847; H04L 12/2697; H04L 12/2602; H04L 1/203; H04L 1/24; H04L 43/08; H04L 1/244; H04B 17/21; H04B 17/29; H04B 17/318; H04B 17/00; H04B 17/103; H04B 17/16; H04B 17/0085; H04B 17/309;

(Continued)

(56) References Cited

U.S. PATENT DOCUMENTS 7,689,213 B2   3/2010   Olgaard et al.
8,811,194 B2   8/2014   Olgaard et al.

(Continued)

FOREIGN PATENT DOCUMENTS

| JP | 2000039460 |      | 2/2000 |
| JP | 2002279463 |      | 9/2002 |
| WO | 2005041470 | A1   | 5/2005 |

OTHER PUBLICATIONS

Jul. 29, 2016—(WO) International Search Report—App PCT/US2016/022334.

(Continued)

*Primary Examiner* — Marsha D Banks Harold
*Assistant Examiner* — Elton Williams
(74) *Attorney, Agent, or Firm* — Rosenbaum IP, P.C.

(57) ABSTRACT

Method for testing a radio frequency (RF) data packet signal transceiver device under test (DUT) via a wireless signal medium that enables final functional testing of a fully assembled DUT without requiring wired signal connections. System performance characteristics indicative of manufacturing assembly defects, such as defective antennas or subsystem connections, can be performed using over the air (OTA) test signals communicated wirelessly between the DUT and a tester. By using actual DUT performance characteristics determined during earlier manufacturing tests, such as receiver sensitivity and transmitter power, and known power levels available from the tester transmitter, the OTA signal path loss (i.e., attenuation of the wireless signal) can be estimated and used to confirm the final state of system operation.

18 Claims, 7 Drawing Sheets

(58) Field of Classification Search
CPC ...... H04B 17/15; H04W 24/00; H04W 24/06; H04W 24/08; H04W 52/242; Y04S 40/168
See application file for complete search history.

(56) References Cited

U.S. PATENT DOCUMENTS

| | | | | |
|---|---|---|---|---|
| 2006/0274657 | A1* | 12/2006 | Olgaard | H04L 12/2602 370/235 |
| 2008/0287117 | A1* | 11/2008 | Olgaard | H04B 17/0085 455/423 |
| 2009/0003272 | A1* | 1/2009 | Payne | H04W 24/08 370/329 |
| 2009/0124252 | A1 | 5/2009 | Jin et al. | |
| 2010/0062722 | A1* | 3/2010 | Dykema | H04B 17/318 455/67.11 |
| 2012/0052816 | A1 | 3/2012 | Chang et al. | |
| 2012/0231745 | A1* | 9/2012 | Gregg | H04B 17/309 455/67.12 |
| 2013/0028100 | A1* | 1/2013 | Olgaard | H04L 1/24 370/242 |
| 2014/0194069 | A1* | 7/2014 | Liu | H04B 17/29 455/67.14 |
| 2015/0036729 | A1 | 2/2015 | Olgaard et al. | |
| 2015/0139023 | A1 | 5/2015 | Olgaard et al. | |

OTHER PUBLICATIONS

Office Action issued in corresponding foreign application, Taiwan Application No. 105112798, pp. 1-9 (Jan. 13, 2020).
Office Action issued in corresponding foreign application, Japanese Application No. JP2017-554427, pp. 1-4 (dated Feb. 4, 2020).

* cited by examiner

NO FAULTS BASELINE

IMPLICIT LOSS (IL) = -50 – (-90) = 40 dB

EXTRAPOLATED PO = -25 + 40 = +15 dBm

DE SENSE DEFECT – DUT RX

IMPLICIT LOSS (IL) = -45 – (-90) = 45 dB

EXTRAPOLATED PO = -25 + 45 = +20 dBm

TX DEFECT

ANTENNA INTEGRITY DEFECT

IMPLICIT LOSS (IL) = -40 − (-90) = 50 dB

EXTRAPOLATED PO = -35 + 50 = +15 dBm

METHOD FOR TESTING A RADIO FREQUENCY (RF) DATA PACKET SIGNAL TRANSCEIVER VIA A WIRELESS SIGNAL PATH

BACKGROUND

The present invention relates to testing of a radio frequency (RF) data packet signal transceiver, and in particular, to testing such a device via a wireless signal path.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

During manufacturing, the testing of such wireless devices (i.e., prior to full assembly including the system housing, or case, and antenna system, which can involve one or more antennas depending upon modes of wireless operations) typically involves conveyance of test signals between the tester and DUT via conductive signal paths, such as RF cabling and connectors (e.g., coaxial). Later, after full assembly, further tests are typically performed to make sure that the antenna system and connections (signals and power) are operating properly and that no other post-assembly defects (e.g., electronic, mechanical or electro-mechanical) have occurred.

Proper operation of a fully assembled DUT can be determined by a combination of DUT receiver and transmitter tests where the receiver sensitivity (e.g., measured in terms of bit error rate (BER) or packet error rate (PER), defined as the number of incorrectly received data bits or packets divided by the total number of transmitted bits or packets, respectively) is better (i.e., lower) than a specified value, and transmitter power output is found to be within a desired power range. However, determining receiver sensitivity and/or transmitter output power accurately in a wireless test environment (e.g., a testing environment involving radiative conveyance of test signals between the tester and DUT) tends to be problematic due to sensitivity of the positioning of the DUT within the test environment caused by variables associated with distances between the tester and DUT antennas, such as signal attenuation and multipath effects.

To avoid these testing issues, while conductive signal paths could be used, such testing techniques cannot be used to include effects from wireless signal issues associated with antenna systems and connections.

It would be desirable to enable testing of receiver sensitivity and transmitter power levels, which tend to be indicative of manufacturing or assembly-related defects, and to do so without first needing to, somehow, determine absolute signal loss within the wireless signal path, particularly since such signal path loss will change even with small changes in positioning of the DUT relative to the tester. Accordingly, a testing method that can identify defects in either receiver sensitivity or transmitter output power levels, or both, following full DUT assembly, without requiring determination of absolute signal path loss will require fewer testing steps and reduce testing costs while also preserving test accuracy and integrity.

SUMMARY

In accordance with the presently claimed invention, a method is provided for testing a radio frequency (RF) data packet signal transceiver device under test (DUT) via a wireless signal medium that enables final functional testing of a fully assembled DUT without requiring wired signal connections. System performance characteristics indicative of manufacturing assembly defects, such as defective antennas or subsystem connections, can be performed using over the air (OTA) test signals communicated wirelessly between the DUT and a tester. By using actual DUT performance characteristics determined during earlier manufacturing tests, such as receiver sensitivity and transmitter power, and known power levels available from the tester transmitter, the OTA signal path loss (i.e., attenuation of the wireless signal) can be estimated and used to confirm the final state of system operation.

In accordance with one embodiment of the presently claimed invention, a method for testing a radio frequency (RF) data packet signal transceiver device under test (DUT) via a wireless signal path includes:

transmitting, from a tester via a wireless signal path, a tester data packet signal including a plurality of tester data packets and having a transmitted tester data packet signal power as transmitted from the tester;

receiving, with the tester from a DUT via the wireless signal path, a DUT data packet signal including a plurality of DUT data packets and having a received DUT data packet signal power as received at the tester;

repeating the transmitting and receiving of the tester and DUT data packet signals while altering the transmitted tester data packet signal power to another transmitted tester data packet signal power at which a ratio of the pluralities of DUT and tester data packets substantially equals a predetermined ratio value related to a receiver sensitivity power of the DUT;

computing a wireless signal path loss of the wireless signal path related to a difference between the another transmitted tester data packet signal power and the receiver sensitivity power; and following reception with the tester of the DUT data packet signal, comparing at least one sum of the received DUT data packet signal power and the wireless signal path loss with an expected transmitted DUT data packet signal power.

In accordance with another embodiment of the presently claimed invention, a method for testing a radio frequency (RF) data packet signal transceiver device under test (DUT) via a wireless signal path includes:

receiving, with a DUT from a tester via a wireless signal path, a tester data packet signal including a plurality of tester data packets and having a transmitted tester data packet signal power as transmitted from the tester;

transmitting, with the DUT via the wireless signal path, a DUT data packet signal including a plurality of DUT data packets and having a received DUT data packet signal power as received at the tester;

repeating the receiving and transmitting of the tester and DUT data packet signals with the received tester data packet signal having another transmitted tester data packet signal power at which a ratio of the pluralities of DUT and tester data packets substantially equals a predetermined ratio value related to a receiver sensitivity power of the DUT;

computing a wireless signal path loss of the wireless signal path related to a difference between the another transmitted tester data packet signal power and the receiver sensitivity power; and following transmission with the DUT of the DUT data packet signal, comparing at least one sum of the received DUT data packet signal power and the wireless signal path loss with an expected transmitted DUT data packet signal power.

In accordance with another embodiment of the presently claimed invention, a method for testing a radio frequency (RF) data packet signal transceiver device under test (DUT) via a wireless signal path includes:

transmitting, from a tester via a wireless signal path, a tester data packet signal including a plurality of tester data packets and having a transmitted tester data packet signal power as transmitted from the tester;

receiving, with the DUT via the wireless signal path, the tester data packet signal;

transmitting, with the DUT via the wireless signal path, a DUT data packet signal including a plurality of DUT data packets;

receiving, with the tester via the wireless signal path, the DUT data packet signal having a received DUT data packet signal power as received at the tester;

repeating the transmitting and receiving of the tester and DUT data packet signals while altering the transmitted tester data packet signal power to another transmitted tester data packet signal power at which a ratio of the pluralities of DUT and tester data packets substantially equals a predetermined ratio value related to a receiver sensitivity power of the DUT;

computing a wireless signal path loss of the wireless signal path related to a difference between the another transmitted tester data packet signal power and the receiver sensitivity power; and following reception with the tester of the DUT data packet signal, comparing at least one sum of the received DUT data packet signal power and the wireless signal path loss with an expected transmitted DUT data packet signal power.

DETAILED DESCRIPTION

Figure 1:
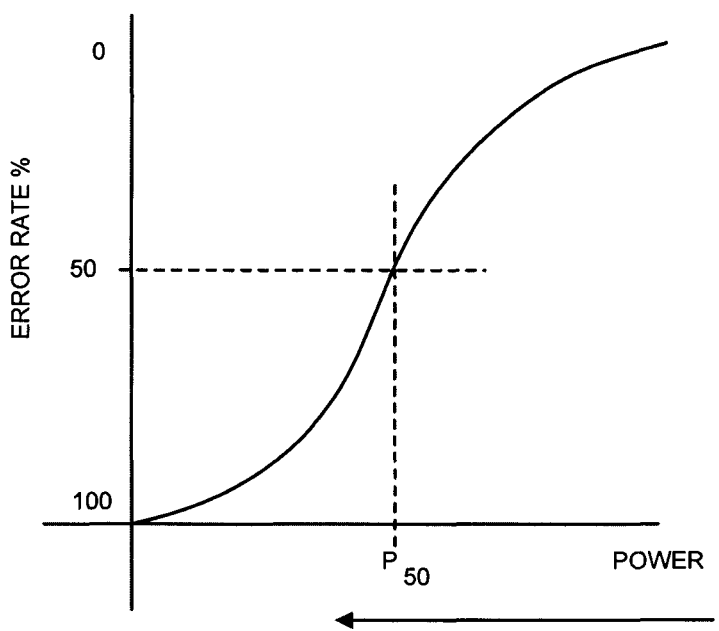
FIG. 1 depicts an exemplary performance curve of a DUT in terms of error rate percentage versus received signal power (e.g., BER or PER).

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

In accordance with exemplary embodiments of the presently claimed invention, as discussed in more detail below, it is possible to determine whether manufacturing and/or assembly defects have occurred that affect receiver sensitivity or transmitter power performance of a DUT without requiring that absolute signal path loss in a wireless testing environment be first determined. As will be readily appreciated by one of ordinary skill in the art, testing of a partially assembled DUT using conductive signal paths will have ensured satisfactory receiver signal sensitivity. Such measured sensitivity should not be affected or otherwise change as a result of full assembly of the DUT, and should serve as a reference point for later use. This should generally hold true since final assembly should not affect any active circuitry of the DUT, and only passive devices typically exist outside of such active circuitry.

Then, following full assembly of the DUT, the receiver sensitivity can be tested by providing a tester signal with a power level reduced to that which produces a known or prescribed error rate (e.g., a 50% PER), which was determined during manufacturing tests. Further, as discussed in more detail below, this also enables measurement of DUT transmitted power based on the responsive data packets (e.g., acknowledgment (ACK) data packets) transmitted by the DUT during testing of its sensitivity.

Referring to FIG. 1, the 50% PER point is preferably used as the typical PER curve of a DUT has its maximum slope at this point, thereby making it less sensitive to statistical variations. Further, it enables easier iterative algorithms, thereby enabling faster testing. (See, for example, U.S. patent application Ser. No. 13/959,354, entitled "Method for Testing Sensitivity of a Data Packet Signal Transceiver", incorporated herein by reference.) Of course, PER points other than 50% can also be used for purposes of determining whether the measured PER point is less than or greater, as well as for defining the DUT receiver sensitivity, i.e., the minimum level of signal detected by the receiver to guarantee that a specified maximum receive PER is not exceeded.

As discussed in more detail below, the difference between the radiated power level of the signal transmitted by the tester and the previously measured DUT receiver sensitivity power level (the reference point) accounts for implicit losses (including signal path loss) within the wireless signal test environment. As noted, this implicit loss will be substantially the same for signals conveyed from the DUT to the tester as well, provided the positioning of the DUT relative to the tester remains consistent within the wireless testing environment and the tester and DUT transmitted signals are transmitted at the same frequency, or within a relatively narrow frequency range. (As will be readily appreciated, any potential frequency range over which results can be expected to be reasonably consistent will be dependent upon the degree to which signal phases of respective frequency components are affected by the wireless signal environment.)

As a result, once this implicit loss figure has been determined, it can be used with the expected receiver sensitivity figure for the DUT receiver test signals and the expected DUT output power signal levels for DUT transmitter signals for purposes of confirming receiver and transmitter signal performance and path integrity. As discussed in more detail below, by determining how these figures differ from those which are expected, it can be determined if the failure is due to manufacturing or assembly-related defects in the receive or transmit signal paths of the DUT (e.g., reduction in DUT receiver sensitivity or issues with the antenna system or connections).

Figure 2:
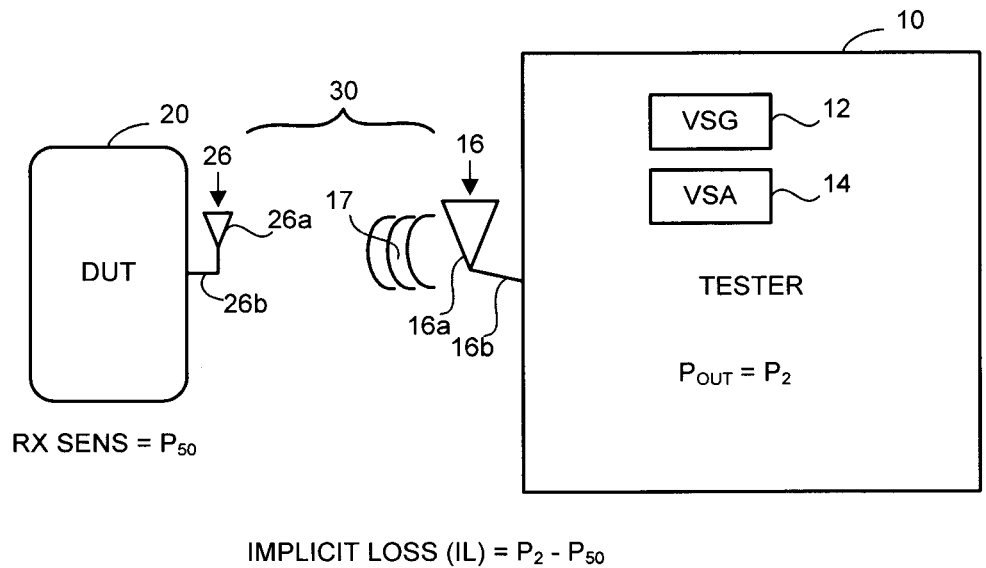
FIG. 2 depicts a wireless signal testing environment in which the implicit loss of the wireless signal path between the tester and DUT can be determined.
Figure 2:
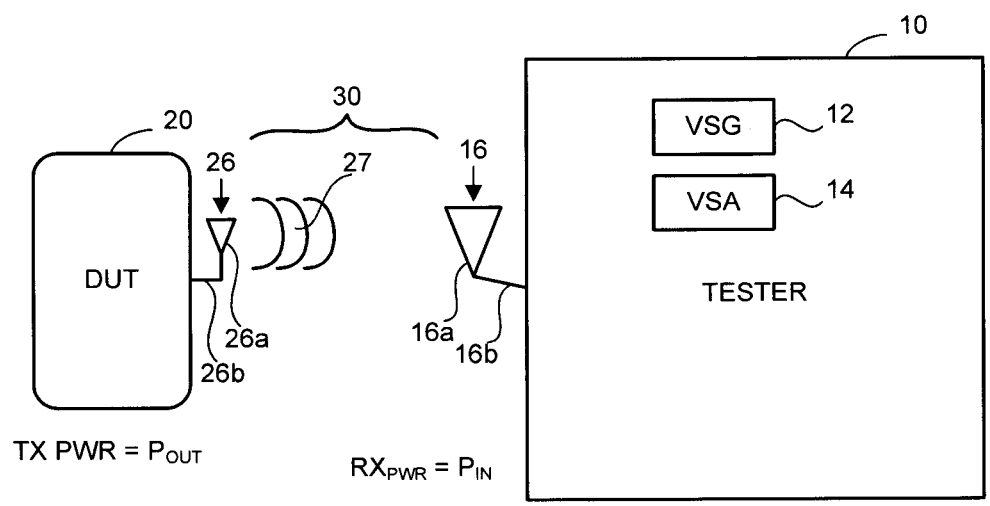

Referring to FIG. 2, a wireless signal testing environment for performing tests in accordance with exemplary embodiments of the presently claimed invention includes a tester 10 and DUT 20 separated by a wireless signal path 30. (As will be readily appreciated, this testing environment can be expanded as desired to include multiple DUTs for testing multiple DUTs simultaneously or serially.) The tester 10 typically includes (or has remote access to and control over) a test signal source, e.g., a VSG 12, and a test signal analysis system, e.g., a VSA 14, as noted above. The tester 10 also includes an antenna system 16 including an antenna 16a (which, alternatively, may include multiple antenna elements) and antenna connection 16b (e.g., a threaded co-axial RF signal connector as is commonly known and used in the art) for and electrically connecting (and, often, mechanically securing) the antenna 16a to the tester 10 and circuitry within the tester 10. Test signals from the signal source 12 are radiated by the antenna system 16 as wireless signals 17 for reception by the DUT 20.

Similarly, the DUT 20 includes an antenna system 26 having one or more antenna elements 26a and antenna connections 26b. This antenna system 26 radiates wireless DUT signals 27 from the DUT 20 for reception by the tester 10.

Also included, though not shown here, is a controller, such as a personal computer, which contains and executes a test program for controlling the tester 10 in such a manner as to cause the internal signal source 12 to provide appropriate test signals for reception by the DUT 20, and control the internal signal analysis system 14 for receiving and analyzing signals received from the DUT 20.

Alternatively, the tester 10 and/or the DUT 20 can be pre-programmed with test commands and responses for performing testing in response to wireless signals exchanged between the tester 10 and DUT 20 via the wireless signal path 30 with no, or little, external control. Such testing techniques are described in U.S. Pat. Nos. 7,689,213 and 8,811,194, incorporated herein by reference.

During testing, the tester will have a signal output power provided to the antenna system 16 having a known power level $P_{out}$ equal to a predetermined or programmed power level $P_2$. The DUT 20 will have a known receiver sensitivity $P_{50}$ determined during manufacturing test (e.g., the received signal power level at which the packet error rate of the DUT is 50% as discussed above). The implicit loss is primarily the signal path loss of the wireless signal path 30 between the tester and the DUT and can be computed by finding the difference $P_2-P_{50}$ between the tester power level $P_2$ and the receiver sensitivity level $P_{50}$. (As will be readily appreciated, while this computation is not exact, it is a good estimation. Even if the exact sensitivity value is unknown, (e.g, only PER is being measured), it is nonetheless known that the sensitivity will be within a narrow range defined as between the PER test point and a lower bound established by the inherent noise figure of the DUT receiver.)

Because of signal path loss symmetry, as discussed above, this implicit loss will also be experienced by signals 27 transmitted from the DUT 20 to the tester 10. The power level of the DUT signal 27 as received at the tester 10 (e.g., as measured by the VSA 14) can be used to extrapolate the output power level of the signal 27 transmitted by the DUT 20 by adding this implicit loss $P_{out}=P_{in}+IL$. (This can be confirmed by controlling or programming the DUT 20 to transmit its signals 27 at multiple predetermined power levels and extrapolating the output power level for each measurement.)

Figure 3:
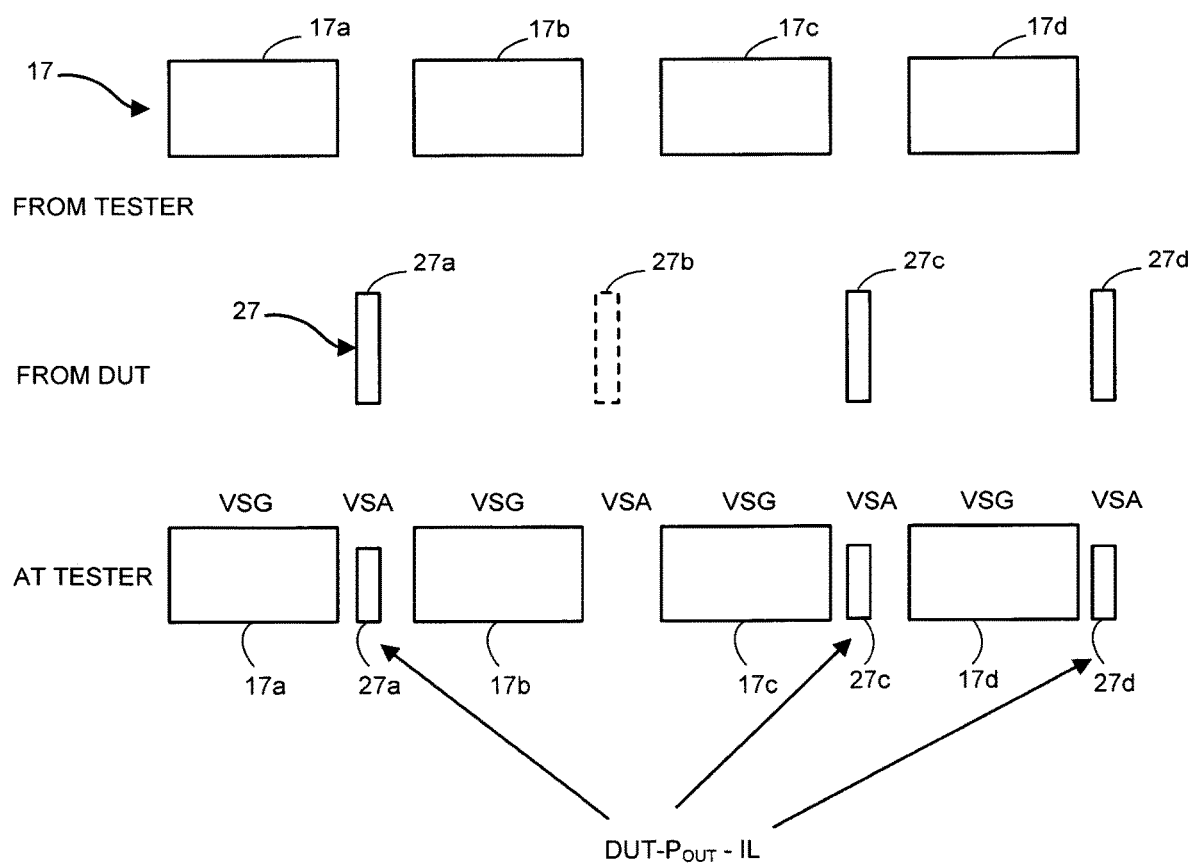
FIG. 3 depicts data packet signals exchanged between the tester and DUT.

Referring to FIG. 3, in accordance with well-known systems and principals, wireless data packet transceiver systems are tested by transmitting data packet signals 17 from the tester to which the DUT responds by sending responsive data packets 27 (e.g., ACK data packets). Accordingly, the tester 10 will transmit a sequence of test data packets 17a, 17b, 17c, 17d, to which the DUT 20 will respond with ACK data packets 27a, 27c, 27d indicating those tester data packets 17a, 17c, 17d which have been successfully received. As depicted here, the second tester data packet 17b was not correctly received by the DUT 20, thereby resulting in the absence, or non-transmission, of a corresponding ACK data packet 27b.

During this exchange of test data packets 17 and ACK data packets 27, the ACK data packets 27 are typically transmitted between sequential test data packets in response to the immediately preceding test data packet, as shown. Accordingly, in accordance with exemplary embodiments of the presently claimed invention, during this test operation in which test data packets 17 are transmitted to initiate responsive ACK data packets 27 for purposes of determining the implicit loss based on the known receiver sensitivity, the power level of the responsive ACK data packets 27 can be measured for purposes of extrapolating the output power of the signal transmitted by the DUT 20, as discussed above. (As will be readily understood, during transmission of the test data packet signal 17, the VSG 12 transmits such data packets via the antenna system 16, while during reception of the ACK data packet signal 27, the VSA 14 receives such ACK data packets 27 via the antenna system 16.)

Preferably, such measurement of the power level of the ACK data packets 27 received at the tester 10 will be performed following a predetermined time interval or reception of a predetermined number of ACK data packets 27 from the DUT to ensure that the power levels of the data packet signals transmitted by the DUT 20 have settled to their nominal power level. (Techniques for ensuring such power settling has occurred can be found in U.S. patent application Ser. No. 14/082,378, entitled "System and Method for Data Packet Transceiver Testing After Signal Calibration and Power Settling to Minimize Test and Time", incorporated herein by reference.) Similarly, counting of the ACK data packets 27 received at the tester 10 for purposes of measuring PER will preferably be done following such power settling as well as following reception of a sufficient number of such responsive data packets to ensure that PER is being reliably measured.

Alternatively, a technique often referred to as "confidence level testing" can be used where statistical analysis is applied to PER measurements so that pass/fail test results can be found more quickly. During such testing, the PER measurement monitors the number of packets measured and number of packet errors, and then performs a statistical analysis of the probability that the PER will or will not be exceeded. Such a statistical analysis can account for other signal conditions, parameters or characteristics, such as the presence of noise.

Figure 4:
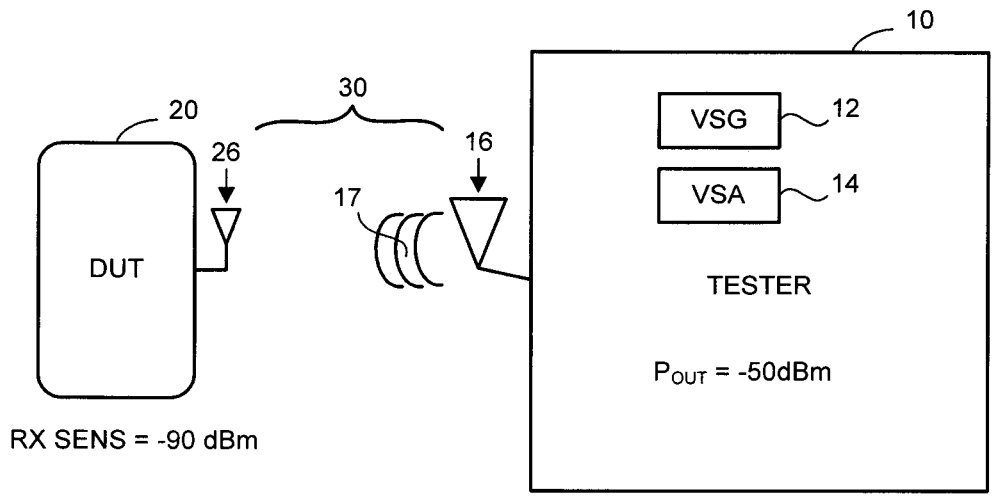
FIG. 4 depicts use of such wireless testing environment where testing reveals satisfactory receiver sensitivity and transmitter output power.
Figure 4:
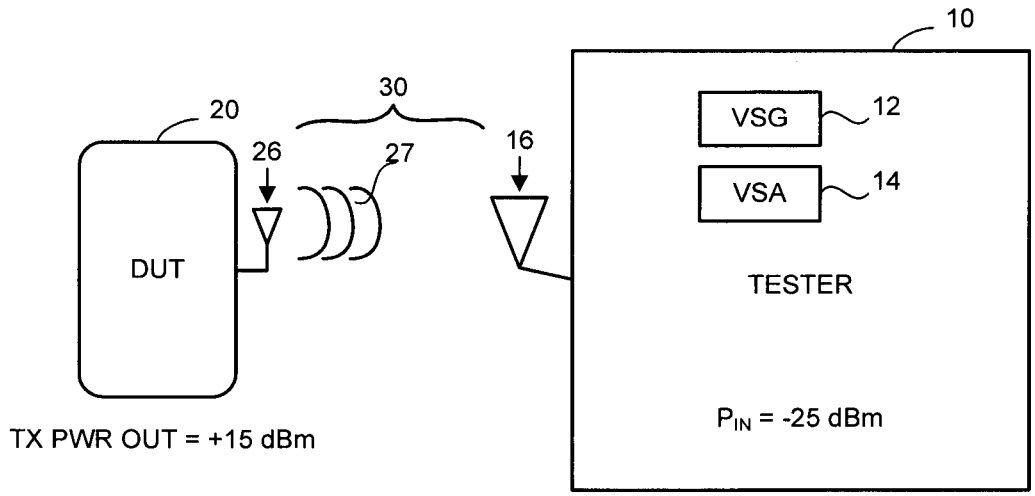

For example, at a confidence level 95% the PER measurement result will be deemed a "pass" before the maximum packet count is reached if there is a 95% probability that the packet errors will not exceed the PER requirement value even if the measurement continues for the maximum packet count. Conversely, the PER measurement result will be deemed a "fail" prior to reaching the maximum packet count there is a 95% probability that the packet errors counted will exceed the PER requirement if the measurement continues for the maximum packet count. In the event that the number of packet errors counted does not enable reliable prediction of a "pass" or "fail," the measurement continues for the maximum packet count. Similarly, if "confidence level testing" is not used, PER measurement runs until the specified maximum number of packets have been transmitted. Referring to FIG. 4, operation of a correctly performing DUT can be confirmed as discussed above. For example, the tester transmits a tester signal 17 having a power output of −50 dBm, and the DUT 20 is known (from prior pre-assembly testing) to have a receiver sensitivity of −90 dBm. In other words, as per the examples above, the signal power received at the antenna assembly 26 of the DUT 20 will be −90 dBm for a 50% PER condition. Accordingly, the implicit loss is the difference between the tester output power (−50 dBm) and the receiver sensitivity (−90 dBm). Hence, with the DUT 20 experiencing a 50% PER during reception of a test data packet signal 17 transmitted at a power level of −50 dBM, the implicit loss is 40 dB. (As will be readily appreciated by one of ordinary skill in the art, these numbers may vary by perhaps a few tenths of a decibel (dB) due to an expected, though small, signal loss due to the DUT antenna system 26.)

Meanwhile, for purposes of testing the DUT transmitter performance, the DUT can be controlled or programmed to transmit its ACK data packets (or some other independent data packet signals) at a known power level for use in extrapolation to confirm proper performance. For example, by controlling or programming the DUT 20 to transmit its data packet signals at a power level of +15 dBm, the received DUT data packet signal at the tester 10 can be measured to confirm its power level is such that when it is added to the implicit loss the sum indicates the same power level. For example, if the tester measures its received DUT data packet signal as −25 dBm, adding the implicit loss of 40 dB to this measured power level should produce the predetermined DUT transmitter output power level of +15 dBm.

Figure 5:
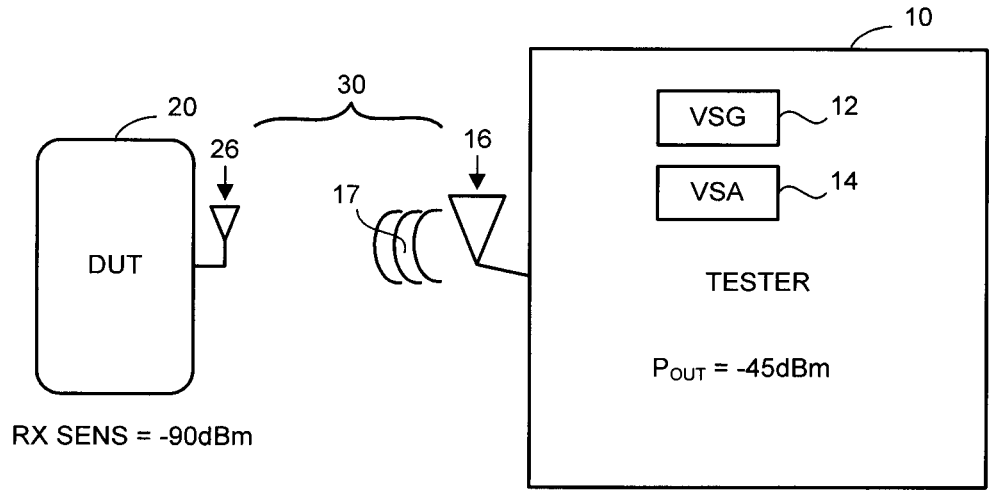
FIG. 5 depicts use of such a wireless testing environment where testing reveals a defect in receiver sensitivity.
Figure 5:
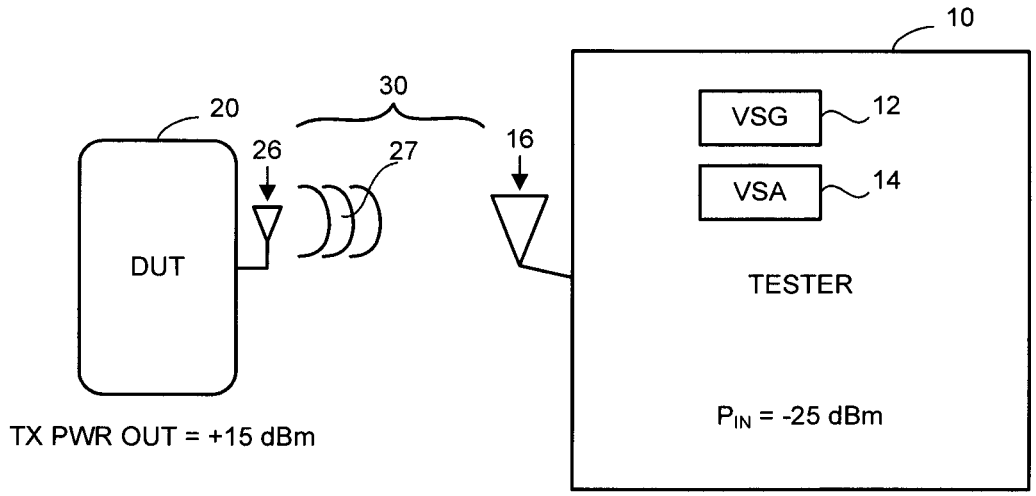

Referring to FIG. 5, a defect, or reduction, in DUT receiver sensitivity can be detected as follows. As before, the tester 10 is controlled or programmed to provide an output power signal at a power level causing the DUT 20 to experience a predetermined PER condition (e.g. 50%). The difference between this tester output power level and the previously measured receiver sensitivity produces what is initially considered to be the implicit loss. For example, if a tester 10 transmitter output power of −45 dBm produces a 50% PER condition in the DUT 20, and the previously measured sensitivity was −90 dBm, then the presumed implicit loss is 45 dB. Then, this presumed implicit loss is used during transmit testing of the DUT 20 during which, at a predetermined DUT transmit power level, the tester 10 measures a received signal of −25 dBm. When this measured received signal power of −25 dBm is summed with the presumed insertion loss, the result is +20 dBm. However, the controlled or programmed output power of the DUT 20 is +15 dBm. This 5 dB difference is, therefore, likely indicative of a defect or DUT assembly issue negatively affecting the sensitivity of the DUT receiver.

Alternatively, if the DUT receiver sensitivity is assumed or otherwise known to be good, then this 5 dB difference can be indicative of an issue with the DUT transmitter output causing the output power to be higher than expected or intended.

Figure 6:
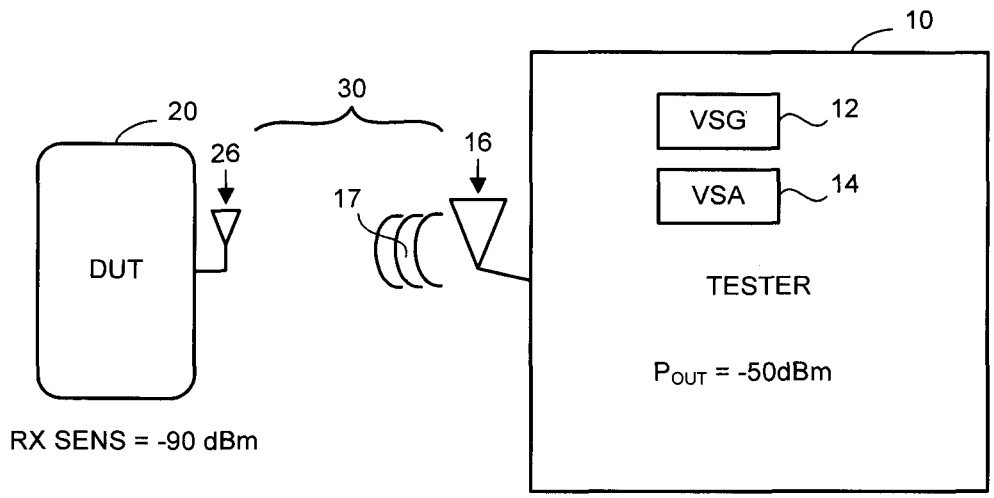
FIG. 6 depicts a use of such a wireless testing environment where testing reveals a defect in transmitter output power.
Figure 6:
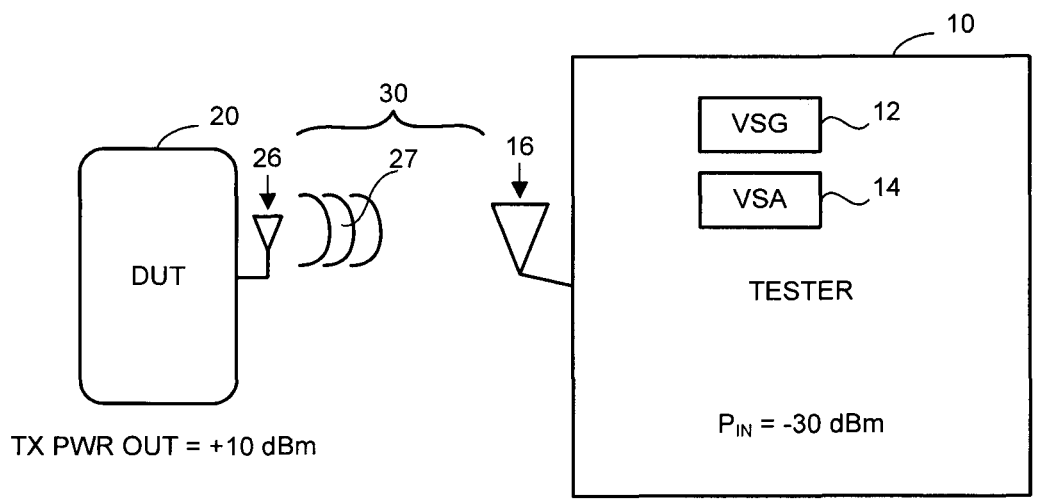

Referring to FIG. 6, a defect or assembly-related issue affecting DUT signal transmission can be detected. As before, the tester 10 is controlled or programmed to produce an output power signal level resulting in the DUT 20 experiencing a 50% PER condition. From this known tester output power level the previously measured receiver sensitivity is subtracted to produce the presumed implicit loss. For example, when such tester output power level is −50 dBm and the receiver sensitivity is −90 dBm, the presumed implicit loss is 40 dB. Then, as before, the DUT 20 is controlled or programmed to produce a transmitted signal 27 having a prescribed power level. The measured power level of the signal received by the tester 10 is added to the presumed implicit loss to extrapolate what this DUT transmit power is. For example, with a received signal power at the tester 10 of −30 dBm and a presumed implicit loss of 40 dB, the extrapolated DUT transmitter power is +10 dBm. If this matches that which was originally controlled or programmed for transmission by the DUT 20 then the transmitted power test is successful. However, if these power levels do not match, then such mismatch can be indicative of a defect or assembly-related issue affecting the DUT transmitted output power.

Figure 7:
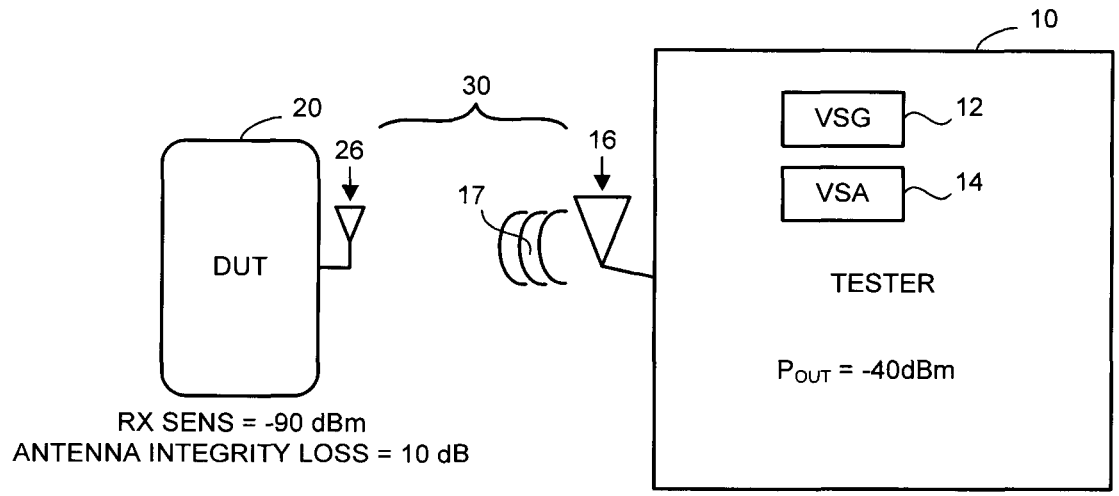
FIG. 7 depicts use of such a wireless testing environment where testing reveals a defect in the integrity of the antenna system.
Figure 7:
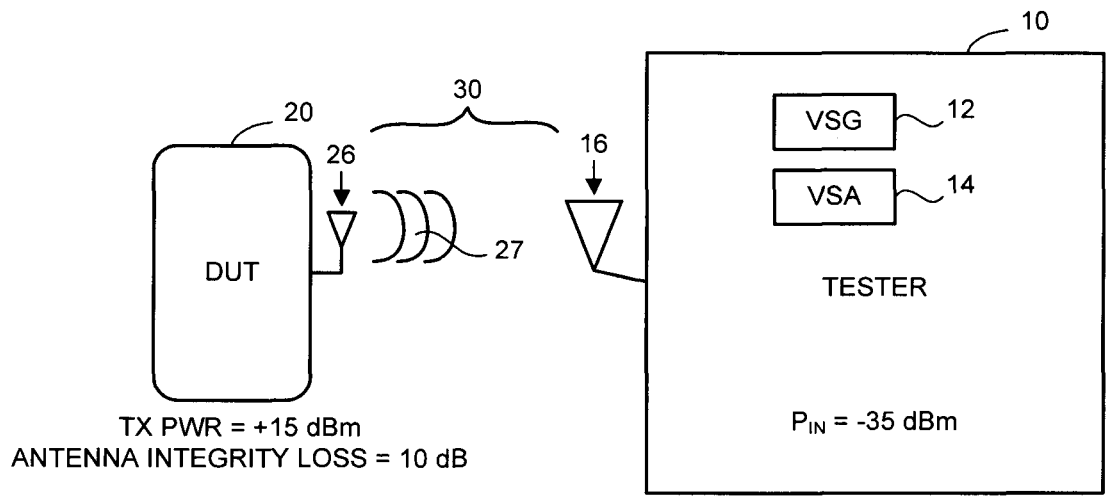

Referring to FIG. 7, a possible defect or issue with the integrity of the antenna system of the DUT 20 can be detected as follows. As before, the tester 10 transmits signals to the DUT 20 resulting in a 50% PER condition, and the implicit loss is determined. Then, signals 27 transmitted from the DUT 20 are received and measured at the tester 10. This measured signal power at the tester 10 is summed with the presumed implicit loss to produce the extrapolated output power from the DUT 20. In this example, all data appear to be consistent with proper operation of the DUT receiver and transmitter circuits. However, when compared to the data found during testing in accordance with FIG. 4, it can be seen that there is a 10 dB difference between both the receive and transmit data. Since these data are the same, i.e., for both receive and transmit tests, it appears likely that a system element common to both receive and transmit signals is defective in some way. The most likely culprit here would be something in or otherwise associated with the antenna system 26.

However, this data, by itself, is insufficient to conclude with certainty that the antenna system 26 is faulty, due to the symmetry of the implicit loss. However, by repeating these tests over multiple frequencies, variations or trends in the measured data can be analyzed for purposes of drawing more inferences about the potential cause. For example, there may be a frequency at which the antenna connection 26b has a poor impedance match with respect to the DUT 20 or antenna element 26a. Alternatively, a frequency may be found where actual signal loss becomes well defined (e.g., with little sensitivity to DUT 20 placement within the testing environment). Such inferences, in combination with subsequent absolute power measurements, may then be used to determine the actual problem.

Accordingly, as discussed above, the presently claimed invention allows implicit loss, a relative signal metric, to provide a qualitative measure of radiative signal losses in a radiative testing environment. Use of such metric along with appropriate tester output power and input power measurements enables simplified testing to determine whether a fully assembled DUT suffers from a receiver, transmitter or antenna integrity related defect.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a radio frequency (RF) data packet signal transceiver device under test (DUT) via a wireless signal path, comprising:

transmitting, from a tester via a wireless signal path and a downlink signal frequency, a tester data packet signal including a plurality of tester data packets and having a transmitted tester data packet signal power as transmitted from said tester;

receiving, with said tester from a DUT via said wireless signal path and an uplink signal frequency, a DUT data packet signal including a plurality of DUT data packets and having a constant received DUT data packet signal power as received at said tester, wherein said downlink and uplink signal frequencies are equal;

repeating said transmitting of said tester data packet signal and said receiving of said DUT data packet signal having said equal downlink and uplink signal frequencies and said constant received DUT data packet signal power while altering said transmitted tester data packet signal power to another transmitted tester data packet signal power as transmitted from said tester at which a ratio of said plurality of received DUT data packets and said plurality of transmitted tester data packets substantially equals a predetermined ratio value related to a previously measured receiver sensitivity power of said DUT, wherein said repeating said transmitting of said tester data packet signal and said receiving of said DUT data packet signal comprises receiving said DUT data packet signal with no change in said received DUT data packet signal power responsive to said tester data packet signal;

computing an implicit signal path loss of said wireless signal path related to a difference between said another transmitted tester data packet signal power and said previously measured receiver sensitivity power; and following reception with said tester of said DUT data packet signal, and without determining an absolute signal path loss of said wireless signal path in either an uplink (UL) direction from said DUT to said tester or a downlink (DL) direction from said tester to said DUT, comparing at least one sum of said received DUT data packet signal power and said implicit signal path loss with an expected transmitted DUT data packet signal power.

2. The method of claim 1, wherein said receiving, with said tester from said DUT via said wireless signal path and an uplink signal frequency, a DUT data packet signal including a plurality of DUT data packets comprises receiving a plurality of DUT data packets indicative of reception at said DUT of a corresponding plurality of tester data packets.

3. The method of claim 1, wherein said altering said transmitted tester data packet signal power to another transmitted tester data packet signal power comprises:

initially transmitting, from said tester via said wireless signal path, said tester data packet signal having an initial transmitted tester data packet signal power as transmitted from said tester; and subsequently transmitting, from said tester via said wireless signal path, said tester data packet signal having one or more subsequent transmitted tester data packet signal powers as transmitted from said tester which are less than said initial transmitted tester data packet signal power.

4. The method of claim 3, wherein said subsequently transmitting, from said tester via said wireless signal path, said tester data packet signal having one or more subsequent transmitted tester data packet signal powers as transmitted from said tester which are less than said initial transmitted tester data packet signal power comprises transmitting said tester data packet signal having a plurality of successively lower transmitted tester data packet signal powers as transmitted from said tester.

5. The method of claim 3, wherein said subsequently transmitting, from said tester via said wireless signal path, said tester data packet signal having a plurality of subsequent transmitted tester data packet signal powers as transmitted from said tester which are less than said initial transmitted tester data packet signal power comprises transmitting said tester data packet signal having alternating increased and decreased transmitted tester data packet signal powers as transmitted from said tester.

6. The method of claim 1, wherein said receiver sensitivity power of said DUT corresponds to a packet error rate (PER) of 50%.

7. A method for testing a radio frequency (RF) data packet signal transceiver device under test (DUT) via a wireless signal path, comprising:

receiving, with a DUT from a tester via a wireless signal path and a downlink signal frequency, a tester data packet signal including a plurality of tester data packets and having a transmitted tester data packet signal power as transmitted from said tester;

transmitting, with said DUT via said wireless signal path and an uplink signal frequency, a DUT data packet signal including a plurality of DUT data packets and having a constant received DUT data packet signal power as received at said tester, wherein said downlink and uplink signal frequencies are equal;

repeating said receiving of said tester data packet signal and said transmitting of said DUT data packet signal having said equal downlink and uplink signal frequencies and said constant received DUT data packet signal power with said received tester data packet signal having another transmitted tester data packet signal power as transmitted from said tester at which a ratio of said plurality of received DUT data packets and said plurality of transmitted tester data packets substantially equals a predetermined ratio value related to a previously measured receiver sensitivity power of said DUT, wherein said repeating said transmitting of said tester data packet signal and said receiving of said DUT data packet signal comprises receiving said DUT data packet signal with no change in said received DUT data packet signal power responsive to said tester data packet signal;

computing an implicit signal path loss of said wireless signal path related to a difference between said another transmitted tester data packet signal power and said receiver sensitivity power; and following transmission with said DUT of said DUT data packet signal, and without determining an absolute signal path loss of said wireless signal path in either an uplink (UL) direction from said DUT to said tester or a downlink (DL) direction from said tester to said DUT, comparing at least one sum of said received DUT data packet signal power and said implicit signal path loss with an expected transmitted DUT data packet signal power.

8. The method of claim 7, wherein said transmitting, with said DUT via said wireless signal path and an uplink signal frequency, a DUT data packet signal including a plurality of DUT data packets comprises transmitting a plurality of DUT data packets indicative of reception at said DUT of a corresponding plurality of tester data packets.

9. The method of claim 7, wherein said repeating said receiving and transmitting of said tester and DUT data packet signals with said received tester data packet signal having another transmitted tester data packet signal power comprises:

initially receiving, with said DUT via said wireless signal path, said tester data packet signal having an initial transmitted tester data packet signal power; and subsequently receiving, with said DUT via said wireless signal path, said tester data packet signal having one or more subsequent transmitted tester data packet signal powers which are less than said initial transmitted tester data packet signal power.

10. The method of claim 9, wherein said subsequently receiving, with said DUT via said wireless signal path, said tester data packet signal having one or more subsequent transmitted tester data packet signal powers which are less than said initial transmitted tester data packet signal power comprises receiving said tester data packet signal having a plurality of successively lower transmitted tester data packet signal powers.

11. The method of claim 9, wherein said subsequently receiving, with said DUT via said wireless signal path, said tester data packet signal having a plurality of subsequent transmitted tester data packet signal powers which are less than said initial transmitted tester data packet signal power comprises receiving said tester data packet signal having alternating increased and decreased transmitted tester data packet signal powers.

12. The method of claim 7, wherein said receiver sensitivity power of said DUT corresponds to a packet error rate (PER) of 50%.

13. A method for testing a radio frequency (RF) data packet signal transceiver device under test (DUT) via a wireless signal path, comprising:

transmitting, from a tester via a wireless signal path and a downlink signal frequency, a tester data packet signal including a plurality of tester data packets and having a transmitted tester data packet signal power as transmitted from said tester;

receiving, with said DUT via said wireless signal path and said downlink signal frequency, said tester data packet signal;

transmitting, with said DUT via said wireless signal path and an uplink signal frequency, a DUT data packet signal including a plurality of DUT data packets, wherein said downlink and uplink signal frequencies are equal;

receiving, with said tester via said wireless signal path and said uplink signal frequency, said DUT data packet signal having a constant received DUT data packet signal power as received at said tester;

repeating said transmitting of said tester data packet signal and said receiving of said DUT data packet signal having said equal downlink and uplink signal frequencies and said constant received DUT data packet signal power while altering said transmitted tester data packet signal power to another transmitted tester data packet signal power as transmitted from said tester at which a ratio of said plurality of received DUT data packets and said plurality of transmitted tester data packets substantially equals a predetermined ratio value related to a previously measured receiver sensitivity power of said DUT, wherein said repeating said transmitting of said tester data packet signal and said receiving of said DUT data packet signal comprises receiving said DUT data packet signal with no change in said received DUT data packet signal power responsive to said tester data packet signal;

computing an implicit signal path loss of said wireless signal path related to a difference between said another transmitted tester data packet signal power and said receiver sensitivity power; and following reception with said tester of said DUT data packet signal, and without determining an absolute signal path loss of said wireless signal path in either an uplink (UL) direction from said DUT to said tester or a downlink (DL) direction from said tester to said DUT, comparing at least one sum of said received DUT data packet signal power and said implicit signal path loss with an expected transmitted DUT data packet signal power.

14. The method of claim 13, wherein said transmitting, with said DUT via said wireless signal path and an uplink signal frequency, a DUT data packet signal including a plurality of DUT data packets comprises transmitting a plurality of DUT data packets indicative of reception at said DUT of a corresponding plurality of tester data packets.

15. The method of claim 13, wherein said altering said transmitted tester data packet signal power to another transmitted tester data packet signal power comprises:

initially transmitting, from said tester via said wireless signal path, said tester data packet signal having an initial transmitted tester data packet signal power as transmitted from said tester; and subsequently transmitting, from said tester via said wireless signal path, said tester data packet signal having one or more subsequent transmitted tester data packet signal powers as transmitted from said tester which are less than said initial transmitted tester data packet signal power.

16. The method of claim 15, wherein said subsequently transmitting, from said tester via said wireless signal path, said tester data packet signal having one or more subsequent transmitted tester data packet signal powers as transmitted from said tester which are less than said initial transmitted tester data packet signal power comprises transmitting said tester data packet signal having a plurality of successively lower transmitted tester data packet signal powers as transmitted from said tester.

17. The method of claim 15, wherein said subsequently transmitting, from said tester via said wireless signal path, said tester data packet signal having a plurality of subsequent transmitted tester data packet signal powers as transmitted from said tester which are less than said initial transmitted tester data packet signal power comprises transmitting said tester data packet signal having alternating increased and decreased transmitted tester data packet signal powers as transmitted from said tester.

18. The method of claim 13, wherein said receiver sensitivity power of said DUT corresponds to a packet error rate (PER) of 50%.

* * * * *